United States Patent
Zhang et al.

(12)

(10) Patent No.: US 11,750,306 B2
(45) Date of Patent: Sep. 5, 2023

(54) METHOD AND APPARATUS FOR ANTENNA CALIBRATION

(71) Applicant: Telefonaktiebolaget LM Ericsson (publ), Stockholm (SE)

(72) Inventors: Hao Zhang, Guangzhou (CN); Georgy Levin, Ottawa (CA); Ling Zhang, Gothenburg (SE); Ang Feng, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/925,740

(22) PCT Filed: Jun. 24, 2020

(86) PCT No.: PCT/CN2020/098204
§ 371 (c)(1),
(2) Date: Nov. 16, 2022

(87) PCT Pub. No.: WO2021/258356
PCT Pub. Date: Dec. 30, 2021

(65) Prior Publication Data
US 2023/0188225 A1    Jun. 15, 2023

(51) Int. Cl.
*H04B 17/12*    (2015.01)
*H04L 5/00*    (2006.01)

(52) U.S. Cl.
CPC .......... *H04B 17/12* (2015.01); *H04L 5/0005* (2013.01)

(58) Field of Classification Search
CPC ................................. H04B 17/12; H04L 5/00
See application file for complete search history.

(56) References Cited

U.S. PATENT DOCUMENTS

2016/0212643 A1*    7/2016    Park ................ H04B 7/0417

FOREIGN PATENT DOCUMENTS

| CN | 102237908 A | 11/2011 |
| CN | 109644029 A | 4/2019 |
| EP | 2920897 A1 | 9/2015 |
| WO | 2015188386 A1 | 12/2015 |
| WO | 2017203324 A1 | 11/2017 |
| WO | 2019086931 A1 | 5/2019 |

* cited by examiner

*Primary Examiner* — Sulaiman Nooristany
(74) *Attorney, Agent, or Firm* — Murphy, Bilak & Homiller, PLLC

(57) ABSTRACT

Embodiments of the present disclosure provide methods and apparatus for antenna calibration. A method implemented at a network function comprises calibrating an antenna of the network function based on available time-frequency resources. The method further comprises communicating with at least one terminal device via the calibrated antenna.

4 Claims, 21 Drawing Sheets

500

502

Calibrating an antenna of the network function based on available time-frequency resources

504

Communicating with at least one terminal device via the calibrated antenna

Removing a phase drift and an amplitude drift between the received AC signals corresponding to the two or more discontinuous resource blocks

624

Concatenating the received AC signals corresponding to the two or more discontinuous resource blocks together in time 700                                                                        702

Communicating with a network function, wherein an antenna of the network function is calibrated based on available time-frequency resources

METHOD AND APPARATUS FOR ANTENNA CALIBRATION

TECHNICAL FIELD

The present disclosure relates generally to the technology of wireless communication, and in particular, to methods and apparatuses for antenna calibration.

BACKGROUND

This section introduces aspects that may facilitate better understanding of the present disclosure. Accordingly, the statements of this section are to be read in this light and are not to be understood as admissions about what is in the prior art or what is not in the prior art.

In a radio access network (RAN) of a wireless communication system such as fourth generation (4G) and fifth generation (5G), a massive MIMO (Multiple Input Multiple Output) or FD-MIMO (full-dimension MIMO) technology is used to enhanced cell coverage, increase throughput, improve spectrum usage, etc. A large number of antennas may be used to support this technology. In high frequency wireless networks utilizing millimeter-wave spectrum, the number of antennas may be expected to reach hundreds.

FD-MIMO creates narrow beams to focus a radiated energy towards a user equipment (UE). In the multi-user MIMO environment, multiple beams are transmitted towards the UEs in order to increase the throughput.

There may be some parameters to achieve good beamforming performance such as the number of antenna branches and the antenna calibration accuracy, etc. Current beamforming schemes presume that all antenna branches are well calibrated.

Antenna calibration (AC) may be used in multiple antenna radios to equalize relative phase, delay and amplitude between multiple branches. There may be various types of AC. FIG. 1 schematically depicts an example of antenna calibration. The AC as shown in FIG. 1 is to send and receive special calibration signals through the radio chains and antenna arrays. The phase, delay and amplitude of each radio branch is detected, measured, and compensated as shown in FIG. 1. DL denotes downlink, UL denotes uplink, Rx denotes receiving, Tx denotes transmitting, ADC denotes Analog to Digital Converter, and DAC denotes Digital to Analog Converter.

As shown in FIG. 1, for example based on a command from a scheduler, the DL AC injection module or circuit may input a DL AC signal to a radio Rx/Tx hardware which may include multiple radio branches. The output signal of the radio Rx/Tx hardware may pass the sum module or circuit to generate a summed AC signal. The summed AC signal may pass the ADC to generate a digital DL AC signal. The digital DL AC signal may be captured by a DL AC capture module or circuit. Finally the captured DL AC signal may be input to a processing & compensation module or circuit for processing and then the phase, delay and amplitude of each radio branch may be detected, measured, and compensated.

For example based on a command from a scheduler, the UL AC injection module or circuit may input the UL AC signals to a DAC to generate an analog UL AC signal. The analog UL AC signal may be split into multiple UL AC signals by a split module or circuit. The split UL AC signals may be input to the radio Rx/Tx hardware. The output signal of the radio Rx/Tx hardware may be captured by a UL AC capture module or circuit. Finally the captured UL AC signal may be input to the processing & compensation module or circuit for processing and then the phase, delay and amplitude of each radio branch may be detected, measured, and compensated.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems of the AC solutions. For example, in some AC solutions, the AC signals are periodically injected as a single injection block. The signals occupy the whole carrier bandwidth for a period of a few LTE/NR symbols. During the injection time, the data traffic is interrupted. Moreover, orthogonal signals are usually used to calibrate multiple antenna branches simultaneously, i.e. the injection time increases when more antenna branches are calibrated at once. For example, calibrating 256 antenna branches simultaneously would require 4 times more of occupied symbols than 64 antenna branches.

FIG. 2 schematically shows an example of a single AC injection block, where the data traffic is interrupted over the entire carrier bandwidth during two blocks. During that time, UE is not able to receive and send any data or control signaling. For example, control and data channels such as PDSCH (Physical Downlink Shared Channel)/PUCCH (Physical Uplink Control Channel)/PUSCH (Physical Uplink Shared Channel) HARQ (Hybrid Automatic Repeat Request)/CSI (Channel State Information)/SR (Scheduling Request) may be impacted, and features such as carrier aggregation, micro sleep, etc. can be affected. When LTE and NR are shared in one carrier (spectrum sharing mode), the AC signals may impact both NR and LTE traffic.

FIG. 3 schematically an example of impact on traffic during periodic AC signal injection. As shown in FIG. 3, since the antenna calibration may be done periodically, the impact on the traffic permanently reoccurs.

To overcome or mitigate at least one of the above mentioned problems or other problem(s), the embodiments of the present disclosure propose an improved AC solution.

In an embodiment, there is provided a method of flexible allocation of special AC signals injected into the RF (radio frequency) branches for the purpose antenna calibration. The proposed method of some embodiments may allow splitting the injected AC signals in time and frequency to avoid impacting critical control and data channels. The proposed method of some embodiments may allow splitting the injected AC signals in time and frequency to minimize the impact on the traffic. The proposed method of some embodiments may allow splitting the injected AC signals in time and frequency to decrease the total number of PRBs (Physical Resource Blocks) occupied by the injected AC signals.

In an embodiment, to eliminate the phase and/or amplitude error due to LO (Local oscillator) drifting between the AC injections, multiple AC signals are overlapped in frequency. After all signal pieces are collected, the phase and/or amplitude drift error may be removed by comparing the overlapped parts.

In an embodiment, the multiple pieces of AC signals may be scheduled in multiple AC cycles. Unoccupied bandwidth may be either interpolated/extrapolated from the estimates within occupied spectrum, or from those obtained in the previous AC cycles. This embodiment can allow reducing traffic interruption during the AC injection time, as well as lowering the processing load and/or storage usage.

A first aspect of the present disclosure provides a method implemented at a network function. The method comprises calibrating an antenna of the network function based on available time-frequency resources. The method further comprises communicating with at least one terminal device via the calibrated antenna.

In embodiments of the present disclosure, scheduling all or a part of the AC signals based on the available time-frequency resources may comprise: calibrating an antenna of the network function based on available time-frequency resources may comprise determining the available time-frequency resources for antenna calibration, AC, signals for the antenna of the network function; scheduling all or a part of the AC signals based on the available time-frequency resources; transmitting the scheduled AC signals to respective input of at least one radio chain of the network function; receiving the scheduled AC signals from respective output of the at least one radio chain of the network function; and performing the AC based on the received AC signals.

In embodiments of the present disclosure, scheduling all or a part of the AC signals based on the available time-frequency resources may comprise: for each round AC signals injection, scheduling all of the AC signals based on the available time-frequency resources In embodiments of the present disclosure, scheduling all or a part of the AC signals based on the available time-frequency resources may comprise: for at least one specific round AC signals injection, scheduling all of the AC signals based on the available time-frequency resources and for other round AC signals injection, scheduling a part of the AC signals based on the available time-frequency resources.

In embodiments of the present disclosure, the at least one specific round AC signals injection may comprise a startup round AC signals injection.

In embodiments of the present disclosure, when all of the AC signals are scheduled, all of the AC signals may be scheduled at one time-frequency resource block or multiple time-frequency resource blocks.

In embodiments of the present disclosure, when a part of the AC signals are scheduled, the part of the AC signals may be scheduled at one time-frequency resource block or multiple time-frequency resource blocks.

In embodiments of the present disclosure, at least two of the multiple time-frequency resource blocks may occupy different frequency bandwidths and different time windows.

In embodiments of the present disclosure, the AC signals are required to occupy two or more continuous resource blocks in time, when at least one of the AC signals is scheduled at two or more discontinuous resource blocks in time, the method may further comprise removing a phase drift and an amplitude drift between the received AC signals corresponding to the two or more discontinuous resource blocks; and concatenating the received AC signals corresponding to the two or more discontinuous resource blocks together in time.

In embodiments of the present disclosure, there may be at least one overlapped resource block in frequency between at least two of the multiple time-frequency resource blocks.

In embodiments of the present disclosure, the at least one overlapped resource block in frequency between at least two of the multiple time-frequency resource blocks may be used for removing a phase drift and an amplitude drift when the received AC signals corresponding to the multiple time-frequency resource blocks are combined.

In embodiments of the present disclosure, there may be at least one overlapped AC resource block in frequency between respective time-frequency resources blocks scheduled for two adjacent round AC signals injections.

In embodiments of the present disclosure, the at least one overlapped AC resource block in frequency between respective time-frequency resources blocks scheduled for two adjacent round AC signals injections may be used for removing a phase drift and an amplitude drift when the received AC signals for the two adjacent round AC signals injections are combined.

In embodiments of the present disclosure, the AC signals injection may be periodical.

In embodiments of the present disclosure, same or different AC time windows may be configured to calibrate different carriers.

In embodiments of the present disclosure, the antenna may be an array antenna.

In embodiments of the present disclosure, the network function may be radio access network, RAN.

In embodiments of the present disclosure, the AC signals are multiple orthogonal AC signals for multiple antenna branches.

A second aspect of the present disclosure provides a method implemented at a terminal device. The method comprises communicating with a network function. An antenna of the network function is calibrated based on available time-frequency resources.

A third aspect of the present disclosure provides a network function. The network function comprises a processor; and a memory, the memory containing instructions executable by the processor, whereby the network function is operative to calibrate an antenna of the network function based on available time-frequency resources. The network function is further operative to communicate with at least one terminal device via the calibrated antenna.

A fourth aspect of the present disclosure provides a terminal device. The terminal device comprises a processor; and a memory, the memory containing instructions executable by the processor, whereby the terminal device is operative to communicate with a network function. An antenna of the network function is calibrated based on available time-frequency resources.

A fifth aspect of the present disclosure provides a network function. The network function comprises a calibrating module and a communicating module. The calibrating module may be configured to calibrate an antenna of the network function based on available time-frequency resources. The communicating module may be configured to communicate with at least one terminal device via the calibrated antenna.

In an embodiment, the network function may further comprise a removing module configured to remove a phase drift and an amplitude drift between the received AC signals corresponding to the two or more discontinuous resource blocks and a concatenating module configured to concatenate the received AC signals corresponding to the two or more discontinuous resource blocks together in time.

A sixth aspect of the present disclosure provides a terminal device. The terminal device comprises a communicating module. The communicating module may be configured to communicate with a network function. An antenna of the network function is calibrated based on available time-frequency resources.

A seventh aspect of the present disclosure provides a method implemented at a network function. The method comprises determining available time-frequency resources for antenna calibration, AC, injection. The method further comprises separating an AC signal into multiple pieces of AC signals according to the available time-frequency resources. The method further comprises determining at least one overlapped AC block. The method further comprises sending the multiple pieces of AC signals with scheduled AC blocks to one or more radio chains of an antenna of the network function. The method further comprises receiving the multiple pieces of AC signals from the one or more radio chains of the antenna of the network function. The method further comprises concatenating the received multiple pieces of AC signals by removing a phase and/or amplitude drift of the multiple pieces of AC signals using the at least one overlapped AC blocks. The method further comprises calibrating an antenna of the network function based on the AC signal and the concatenated AC signal.

In an embodiment, the AC signals are multiple orthogonal AC signals for multiple antenna branches.

An eighth aspect of the present disclosure provides a network function. The network function comprises a processor; and a memory, the memory containing instructions executable by the processor, whereby the network function is operative to determining available time-frequency resources for antenna calibration, AC, injection. The network function is operative to separate AC signals into multiple pieces of AC signals according to the available time-frequency resources. The network function is operative to determine at least one overlapped AC block. The network function is operative to send the multiple pieces of AC signals with scheduled AC blocks to one or more radio chains of an antenna of the network function. The network function is operative to receive the multiple pieces of AC signals from the one or more radio chains of the antenna of the network function. The network function is operative to concatenate the received multiple pieces of AC signals by removing a phase and/or amplitude drift of the multiple pieces of AC signals using the at least one overlapped AC blocks. The network function is operative to calibrate an antenna of the network function based on the AC signals and the concatenated AC signals.

A ninth aspect of the present disclosure provides a computer program product comprising instructions which, when executed on at least one processor, cause the at least one processor to carry out any of the methods according to the first, seventh and second aspects of the disclosure.

A tenth aspect of the present disclosure provides a computer-readable storage medium storing instructions which, when executed on at least one processor, cause the at least one processor to carry out any of the methods according to the first seventh and second aspects of the disclosure.

Another aspect of the present disclosure provides a network function. The network function comprises a first determining module, a separating module, a second determining module, a sending module, a receiving module, a concatenating module and a calibrating module. The first determining module may be configured to determine available time-frequency resources for antenna calibration, AC, injection. The separating module may be configured to separate an AC signals into multiple pieces of AC signals according to the available time-frequency resources. The second determining module may be configured to determine at least one overlapped AC block. The sending module may be configured to send the multiple pieces of AC signals with scheduled AC blocks to one or more radio chains of an antenna of the network function. The receiving module may be configured to receive the multiple pieces of AC signals from the one or more radio chains of the antenna of the network function. The concatenating module may be configured to concatenate the received multiple pieces of AC signals by removing a phase and/or amplitude drift of the multiple pieces of AC signals using the at least one overlapped AC blocks. The calibrating module may be configured to calibrate an antenna of the network function based on the AC signals and the concatenated AC signals.

Another aspect of the present disclosure provides a communication system including a host computer including: processing circuitry configured to provide user data; and a communication interface configured to forward the user data to a cellular network for transmission to a terminal device. The cellular network includes a network function above mentioned, and/or the terminal device is above mentioned.

In embodiments of the present disclosure, the system further includes the terminal device, wherein the terminal device is configured to communicate with the network function.

In embodiments of the present disclosure, the processing circuitry of the host computer is configured to execute a host application, thereby providing the user data; and the terminal device includes processing circuitry configured to execute a client application associated with the host application.

Another aspect of the present disclosure provides a communication system including a host computer including: a communication interface configured to receive user data originating from a transmission from a terminal device; a network function. The transmission is from the terminal device to the network function. The network function is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Another aspect of the present disclosure provides a method implemented in a communication system which may include a host computer, a network function and a terminal device. The method may comprise providing user data at the host computer. Optionally, the method may comprise, at the host computer, initiating a transmission carrying the user data to the terminal device via a cellular network comprising the network function which may perform any step of the methods according to the first and seventh aspects of the present disclosure.

Another aspect of the present disclosure provides a communication system including a host computer. The host computer may comprise processing circuitry configured to provide user data, and a communication interface configured to forward the user data to a cellular network for transmission to a terminal device. The cellular network may comprise a network function having a radio interface and processing circuitry. The network function's processing circuitry may be configured to perform any step of the methods according to the first and seventh aspects of the present disclosure.

Another aspect of the present disclosure provides a method implemented in a communication system which may include a host computer, a network function and a terminal device. The method may comprise providing user data at the host computer. Optionally, the method may comprise, at the host computer, initiating a transmission carrying the user data to the terminal device via a cellular network comprising the network function. The terminal device may perform any step of the method according to the second aspect of the present disclosure.

Another aspect of the present disclosure provides a communication system including a host computer. The host computer may comprise processing circuitry configured to provide user data, and a communication interface configured to forward user data to a cellular network for transmission to a terminal device. The terminal device may comprise a radio interface and processing circuitry. The terminal device's processing circuitry may be configured to perform any step of the method according to the second aspect of the present disclosure.

Another aspect of the present disclosure provides a method implemented in a communication system which may include a host computer, a network function and a terminal device. The method may comprise, at the host computer, receiving user data transmitted to the network function from the terminal device which may perform any step of the method according to the second aspect of the present disclosure.

Another aspect of the present disclosure provides a communication system including a host computer. The host computer may comprise a communication interface configured to receive user data originating from a transmission from a terminal device to a network function. The terminal device may comprise a radio interface and processing circuitry. The terminal device's processing circuitry may be configured to perform any step of the method according to the second aspect of the present disclosure.

Another aspect of the present disclosure provides a method implemented in a communication system which may include a host computer, a network function and a terminal device. The method may comprise, at the host computer, receiving, from the network function, user data originating from a transmission which the network function has received from the terminal device. The network function may perform any step of the methods according to the first and seventh aspects of the present disclosure.

Another aspect of the present disclosure provides a communication system which may include a host computer. The host computer may comprise a communication interface configured to receive user data originating from a transmission from a terminal device to a network function. The network function may comprise a radio interface and processing circuitry. The network function's processing circuitry may be configured to perform any step of the methods according to the first and seventh aspects of the present disclosure.

Embodiments herein afford many advantages, of which a non-exhaustive list of examples follows. In some embodiments herein, the proposed solution can lower impact on traffic data during the AC injection. In some embodiments herein, the proposed solution can lower impact on control channels during the injection. In some embodiments herein, the proposed solution can lower the number of time-frequency resources occupied by the AC signal during an AC cycle. In some embodiments herein, the proposed solution can lower processing load, storage usage and interface bandwidth required to support antenna. The embodiments herein are not limited to the features and advantages mentioned above. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 5 shows a flowchart of a method according to an embodiment of the present disclosure;

DETAILED DESCRIPTION

Figure 1:
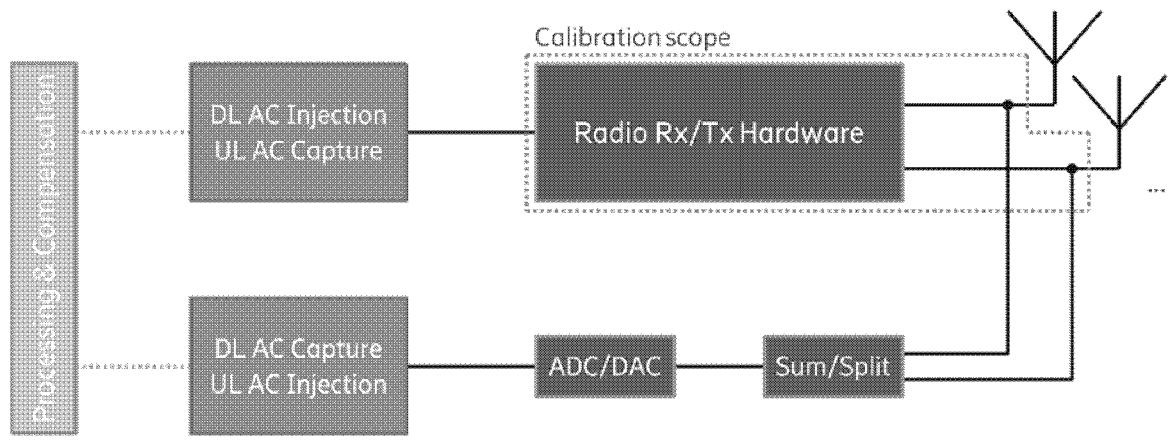
FIG. 1 schematically depicts an example of antenna calibration.
Figure 2:
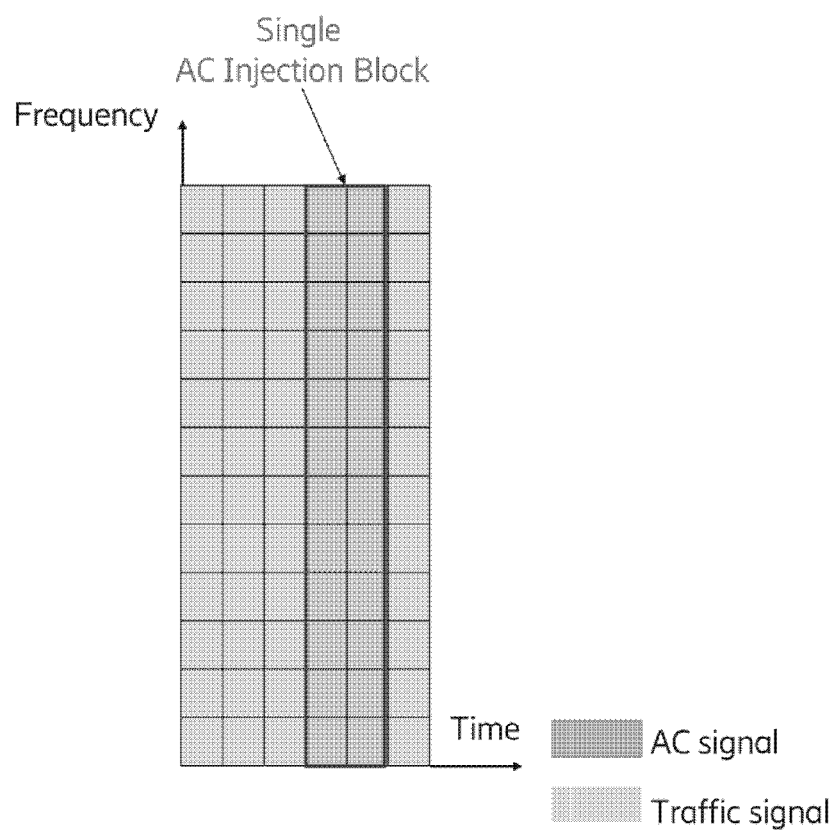
FIG. 2 schematically shows an example of a single AC injection block.
Figure 3:
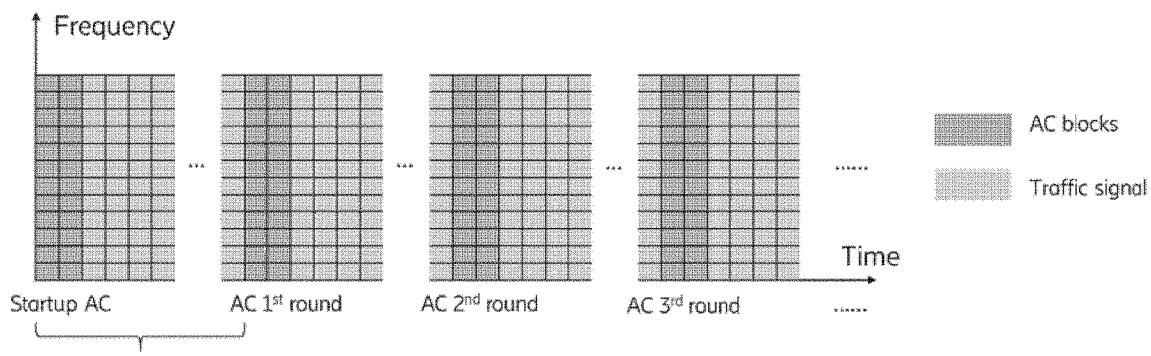
FIG. 3 schematically shows an example of impact on traffic during periodic AC signal injection.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "network node" or "network side node" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), an Integrated Access and Backhaul (IAB) node, a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "network function" refers to any suitable function which can be implemented in a network entity (physical or virtual) of a communication network. For example, a network function can be implemented either as a network element on a dedicated hardware, as a software instance running on a dedicated hardware, or as a virtualised function instantiated on an appropriate platform, e.g. on a cloud infrastructure. In an embodiment, the network function may be the network node" or network side node as described above. In another embodiment, the network function may be Cloud-radio access network (C-RAN).

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL, transmission refers to a transmission from a network device to a terminal device, and an uplink, UL, transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Figure 4:
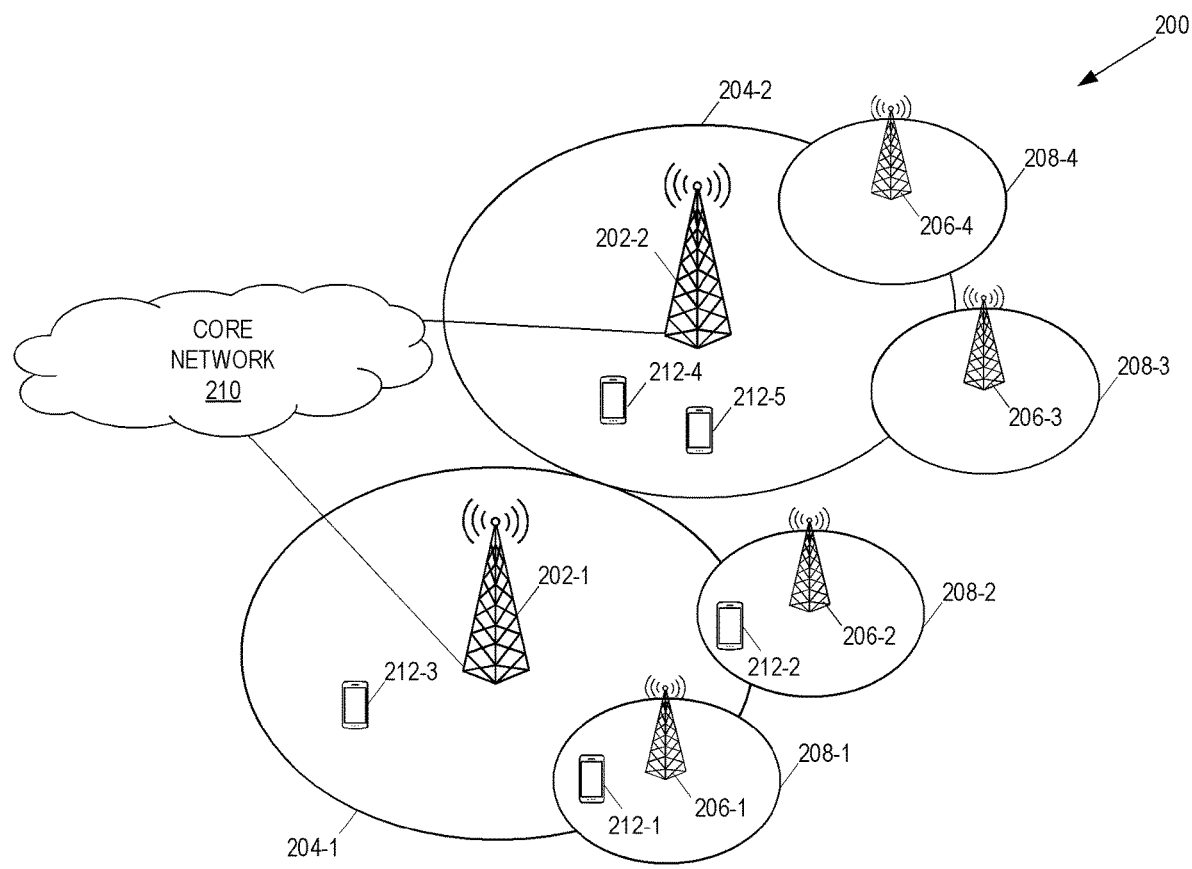
FIG. 4 schematically shows an example of a cellular communications system in which embodiments of the present disclosure may be implemented.

FIG. 4 schematically shows an example of a cellular communications system 200 in which embodiments of the present disclosure may be implemented. In the embodiments described herein, the cellular communications system 200 includes a RAN and a core network. In this example, the RAN includes base stations 202-1 and 202-2, which in the LTE include eNBs (i.e., LTE RAN nodes connected to EPC (Evolved Packet Core)) and in NR include gNB (i.e., NR RAN nodes connected to 5GC (5G core network)), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as 5GC and in LTE is referred to as EPC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs or terminal devices, but the present disclosure is not limited thereto.

FIG. 5 shows a flowchart of a method according to an embodiment of the present disclosure, which may be performed by an apparatus implemented in/as a network function or communicatively coupled to the network function. As such, the apparatus may provide means or modules for accomplishing various parts of the method 500 as well as means or modules for accomplishing other processes in conjunction with other components. The network function may be any suitable network node, device, entity or function which can use an antenna such as array antenna to transmit and/or receiving information such as message or data. In an embodiment, the network function may be RAN or network node or base station such as eNB or gNB, etc.

At block 502, the network function may calibrate an antenna of the network function based on available time-frequency resources. The antenna of the network function may be any suitable antenna which requires to be calibrated. For example, the antenna may include two or more antenna elements which are connected to two or more radio chains. In an embodiment, the antenna may be an array antenna. In different communication system, the time-frequency resources may be of different formats. For example, in some 3GPP system, physical time-frequency resources may correspond to OFDM (Orthogonal Frequency Division Multiplex) symbols and subcarriers within the OFDM symbols. The smallest physical time-frequency resource consists of one subcarrier in one OFDM symbol, known as a resource element. The transmissions are scheduled in group(s) of 12 subcarriers, known as physical resource blocks (PRBs). In the time domain, the radio transmissions may be organized into radio frames, subframes, slots, and mini-slots. For example, each radio frame may have a duration of 10 ms and consists of 10 subframes with a subframe duration of 1 ms. The time duration of a slot/mini-slot scales with the chosen numerology (subcarrier spacing) since the duration of an OFDM symbol is inversely proportional to its subcarrier spacing.

The available time-frequency resources may refer to the time-frequency resources that have not been occupied by signaling message and data. The AC signals may be scheduled at any suitable time, for example after all the signaling messages and/or data are scheduled, before all the signaling messages and/or data are scheduled, after some critical or important signaling messages and/or data are scheduled, etc.

In an embodiment, the AC signals may be scheduled after some critical or important signaling messages and/or data are scheduled. This embodiment can lower impact on signaling messages and data during the AC signals injection.

The network function may calibrate the antenna of the network function based on the available time-frequency resources in various ways. For example, when the network function can find a single available time-frequency resources block for AC injection, then the network function can use the single available time-frequency resources block for calibrating the antenna of the network function. When the network function cannot find a single available time-frequency resources block for AC injection, the network function can try to find two or more available time-frequency resources blocks for calibrating the antenna of the network function. In this case, to eliminate the phase and/or amplitude error due to LO drifting between the AC injections, multiple AC signals may be overlapped in frequency. After all signal pieces are collected, the drift error may be removed by comparing the overlapped parts. In addition, the multiple pieces of AC signals may be scheduled in multiple AC cycles. Unoccupied bandwidth may be either interpolated/extrapolated from the estimates within occupied spectrum, or from those obtained in the previous AC cycles.

Figure 6:
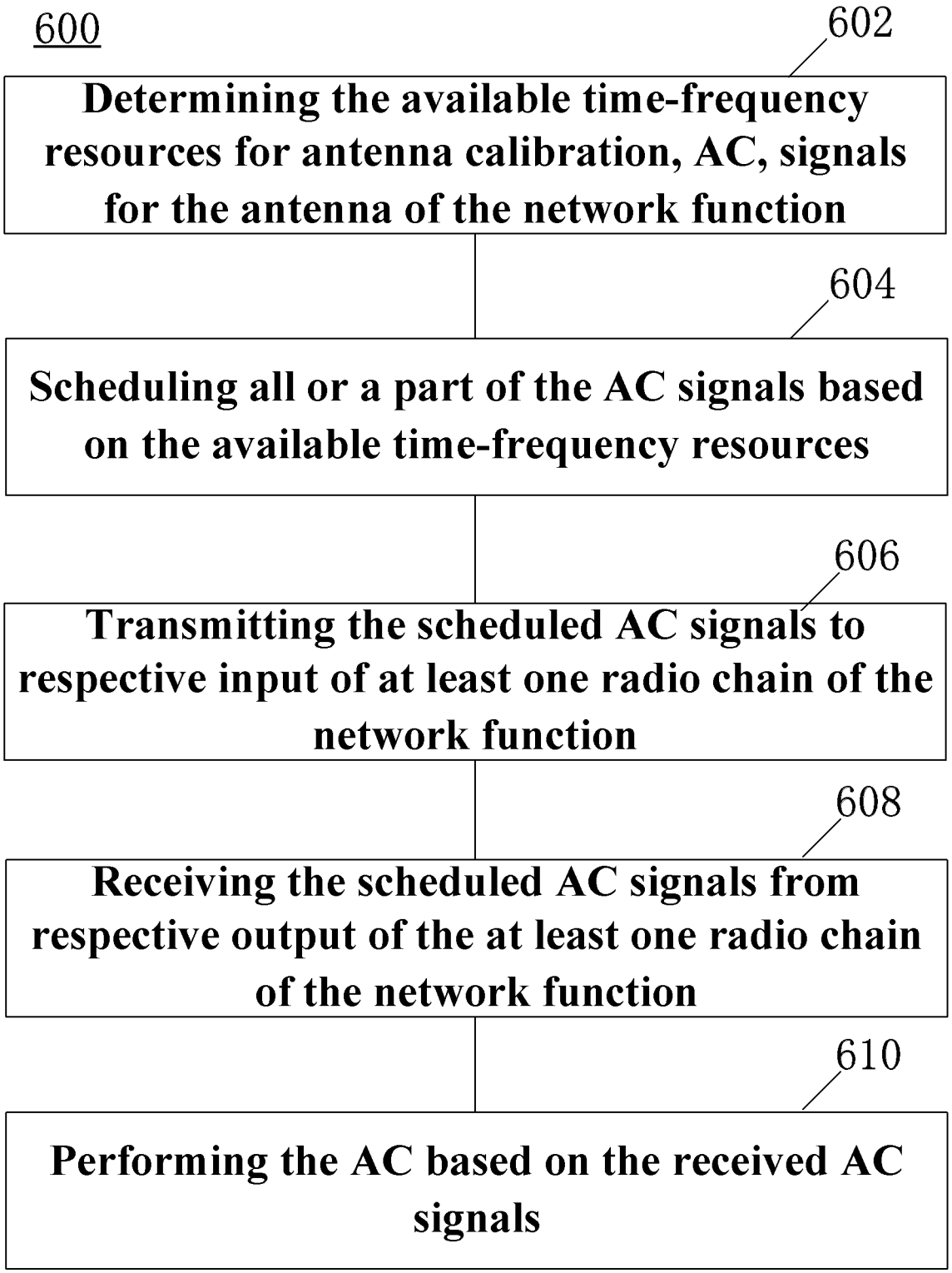
FIG. 6 shows a method of calibrating an antenna of the network function based on available time-frequency resources according to an embodiment of the present disclosure.

FIG. 6 shows a method of calibrating an antenna of the network function based on available time-frequency resources according to an embodiment of the present disclosure.

At block 602, the network function may determine available time-frequency resources for AC signals for the antenna of the network function. For example, depending on the scheduling time of the AC signals, the network function may determine the available time-frequency resources for AC signals for the antenna of the network function.

As a first example, when the AC signals is scheduled after all the signaling messages and/or data are scheduled, the network function may determine the time-frequency resources which are not occupied by all the signaling messages and/or data.

As a second example, when the AC signals is scheduled before all the signaling messages and/or data are scheduled, the network function may determine all the time-frequency resources are available for the AC signals.

As a third example, when the AC signals is scheduled after some critical or important signaling messages and/or data are scheduled, the network function may determine the time-frequency resources which are not occupied by the critical or important signaling messages and/or data.

As a fourth example, when there is not any signaling message and/or data to be scheduled, the network function may determine all the time-frequency resources are available for the AC signals.

At block 604, the network function may schedule all or a part of the AC signals based on the available time-frequency resources.

In embodiments of the present disclosure, the AC signals are multiple orthogonal AC signals for multiple antenna branches.

The network function may schedule all or a part of the AC signals based on the available time-frequency resources in various ways. For example, when the available time-frequency resources occupy a whole bandwidth, the network function may schedule all of the AC signals on the available time-frequency resources. When the available time-frequency resources do not occupy the whole bandwidth, the network function may schedule a part of the AC signals on the available time-frequency resources. To decrease the total number of time-frequency resources occupied by the injected AC signals, multiple pieces of AC signals may be scheduled in multiple AC cycles.

In an embodiment, for each round AC signals injection, the network function may schedule all of the AC signals based on the available time-frequency resources.

In an embodiment, when all of the AC signals are scheduled, all of the AC signals may be scheduled at one time-frequency resource block or multiple time-frequency resource blocks. For example, when the network function can find one time-frequency resource block for the AC signals, all of the AC signals may be scheduled at one time-frequency resource block. Otherwise, all of the AC signals may be scheduled at multiple time-frequency resource blocks.

In an embodiment, when a part of the AC signals are scheduled, the part of the AC signals may be scheduled at one time-frequency resource block or multiple time-frequency resource blocks. For example, when the network function can find one time-frequency resource block for the part of the AC signals, the part of the AC signals may be scheduled at one time-frequency resource block. Otherwise, the part of the AC signals may be scheduled at multiple time-frequency resource blocks.

In an embodiment, at least two of the multiple time-frequency resource blocks may occupy different frequency bandwidths and different time windows.

In an embodiment, there is at least one overlapped resource block in frequency between at least two of the multiple time-frequency resource blocks.

In an embodiment, the at least one overlapped resource block in frequency between at least two of the multiple time-frequency resource blocks may be used for removing a phase drift and an amplitude drift when the received AC signals corresponding to the multiple time-frequency resource blocks are combined.

In an embodiment, there is at least one overlapped AC resource block in frequency between respective time-frequency resources blocks scheduled for two adjacent round AC signals injections.

In an embodiment, the at least one overlapped AC resource block in frequency between respective time-frequency resources blocks scheduled for two adjacent round AC signals injections is used for removing a phase drift and an amplitude drift when the received AC signals for the two adjacent round AC signals injections are combined.

As a first example, when the network function can find a single time-frequency resources block occupying the whole bandwidth for a period of at least one symbol required by the AC signals, then the network function may schedule all of the AC signals on the single time-frequency resources block.

As a second example, to allow traffic and control channels during the AC injection, the AC signals may be scheduled in different time-frequency resources. Although only the relative phase and/or amplitude between the antenna branches at the same time-frequency resource impacts a beamforming performance, the phase discontinuity over the bandwidth is also unacceptable since it decreases the throughput. To avoid the phase discontinuity between the injection blocks due to the LO phase drift, the injection blocks may be overlapped in frequency.

Figure 7A:
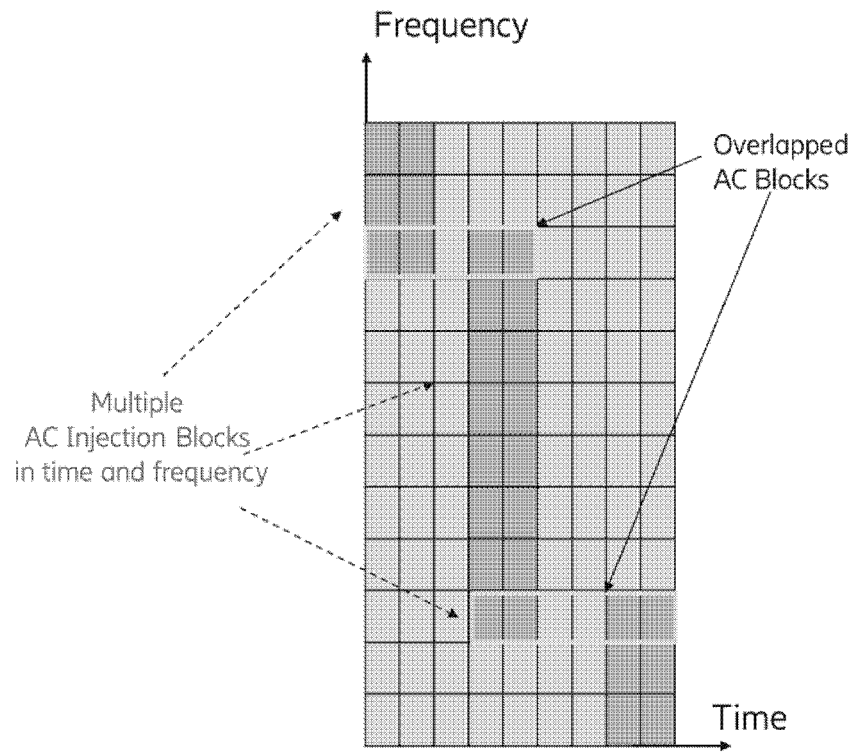
FIG. 7a schematically shows an example of multiple AC injection blocks overlapped in frequency according to an embodiment of the present disclosure.

FIG. 7a schematically shows an example of multiple AC injection blocks overlapped in frequency according to an embodiment of the present disclosure. As shown in FIG. 7a, the AC signals may be scheduled in three time-frequency resources blocks. It is noted that the size and/or location of the overlapped AC blocks as shown in FIG. 7a are only for the purpose of illustration. There may be any other suitable size and/or location of the overlapped AC blocks in other embodiments. It is noted that the size, number and location of the AC time-frequency resources blocks as shown in FIG. 7a are only for the purpose of illustration. There may be any other suitable size, number and location of the AC time-frequency resources blocks in other embodiments.

In some embodiments, a set of orthogonal AC signals are injected simultaneously into multiple antenna branches. To preserve the orthogonality, the length of the injected signals may increase with the number of antenna branches. For example, 4G and 5G radios with several antenna branches may require long AC signals. To avoid the collision with the physical data and control channels, a method of splitting the injected AC signals in time is also disclosed as shown in FIG. 7b.

Figure 7B:
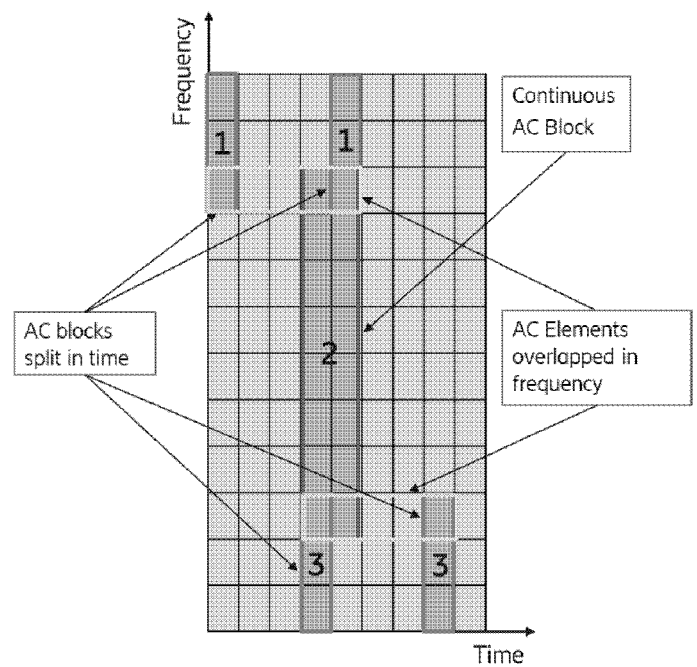
FIG. 7b schematically shows an example of the AC signal containing several AC blocks overlapped in frequency according to an embodiment of the present disclosure.

FIG. 7b shows an example of the AC signal containing several AC blocks overlapped in frequency according to an embodiment of the present disclosure. In this embodiment, it is assumed that the orthogonality is maintained when the length of the AC signal is equal two symbols, i.e. AC block 2 is injected continuously, while AC blocks 1 and 3 are split in time. It is noted that the size and/or location of the overlapped AC blocks as shown in FIG. 7b are only for the purpose of illustration. There may be any other suitable size and/or location of the overlapped AC blocks in other embodiments. It is noted that the size, number and location of the AC time-frequency resources blocks as shown in FIG. 7b are only for the purpose of illustration. There may be any other suitable size, number and location of the AC time-frequency resources blocks in other embodiments.

In an embodiment, for at least one specific round AC signals injection, the network function may schedule all of the AC signals based on the available time-frequency resources and for other round AC signals injection, the network function may schedule a part of the AC signals based on the available time-frequency resources.

Figure 7C:
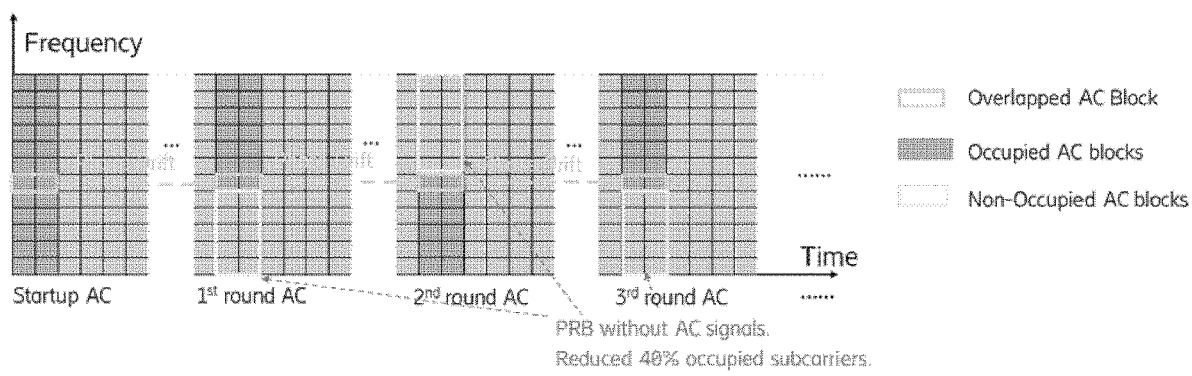
FIG. 7c schematically shows an example of reducing the number of time-frequency resources occupied by the AC signal according to an embodiment of the present disclosure.

FIG. 7c shows an example of reducing the number of time-frequency resources occupied by the AC signal according to an embodiment of the present disclosure. As shown in FIG. 7c, the AC signal occupies the whole frequency bandwidth at the startup calibration. The subsequent AC signals occupy a portion of frequency bins. The amplitude and phase of the non-occupied time-frequency resources of the subsequent AC signal may be extrapolated and/or estimated from the previous AC cycle. Frequency overlapped AC blocks are used to illuminate the phase drift between the AC cycles. It is noted that the size and/or location of the overlapped AC blocks as shown in FIG. 7c are only for the purpose of illustration. There may be any other suitable size and/or location of the overlapped AC blocks in other embodiments. It is noted that the size, number and location of the AC time-frequency resources blocks as shown in FIG. 7c are only for the purpose of illustration. There may be any other suitable size, number and location of the AC time-frequency resources blocks in other embodiments. For example, in each round AC signals injection, the network function may use the examples of the AC signal as shown in FIGS. 7a-7b.

In an embodiment, the at least one specific round AC signals injection may comprise a startup round AC signals injection. In other embodiments, the at least one specific round AC signals injection may further comprise any other suitable round AC signals injection. For example, when the network function can find the available time-frequency resources occupying a whole bandwidth in a specific round AC signals injection, the network function may schedule all of the AC signals based on the available time-frequency resources in that specific round AC signals injection.

In an embodiment, the AC signals injection may be periodical.

In an embodiment, same or different AC time windows are configured to calibrate different carriers.

Some antenna calibration scheduling only considers the time split of AC windows on a sector carrier level, which means that all antenna branches and time-frequency resources under one carrier or different sector carriers inject AC blocks at the same time. The start and end points of AC windows are scheduled in the baseband (BB) and controlled by control messages between the BB and radio.

Figure 7D:
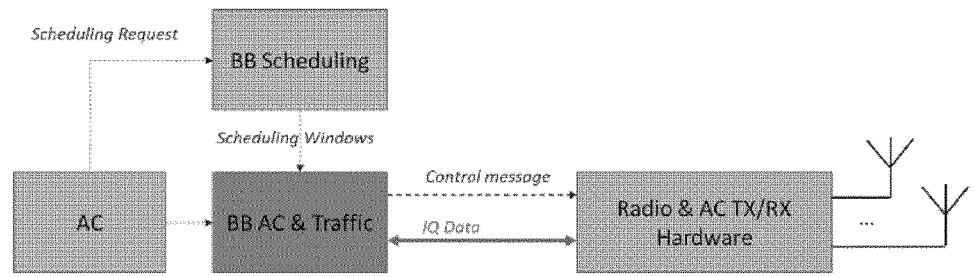
FIG. 7d schematically shows an example of antenna calibration scheduling according to an embodiment of the present disclosure.

FIG. 7d schematically shows an example of antenna calibration scheduling according to an embodiment of the present disclosure. The IQ data here means the traffic and AC signals which are populated in time and frequency resource. (IQ refers to the In-phase and quadrature components of modulated signals). The control message is also sent for controlling the hardware e.g. some switching, etc.

In some embodiments, the start and end points of the AC window can be defined in two ways: an offset specified in certain clock cycles from the radio frame start and the symbol identities within the frame. Thus, the AC window is defined per configured carrier.

Figure 7E:
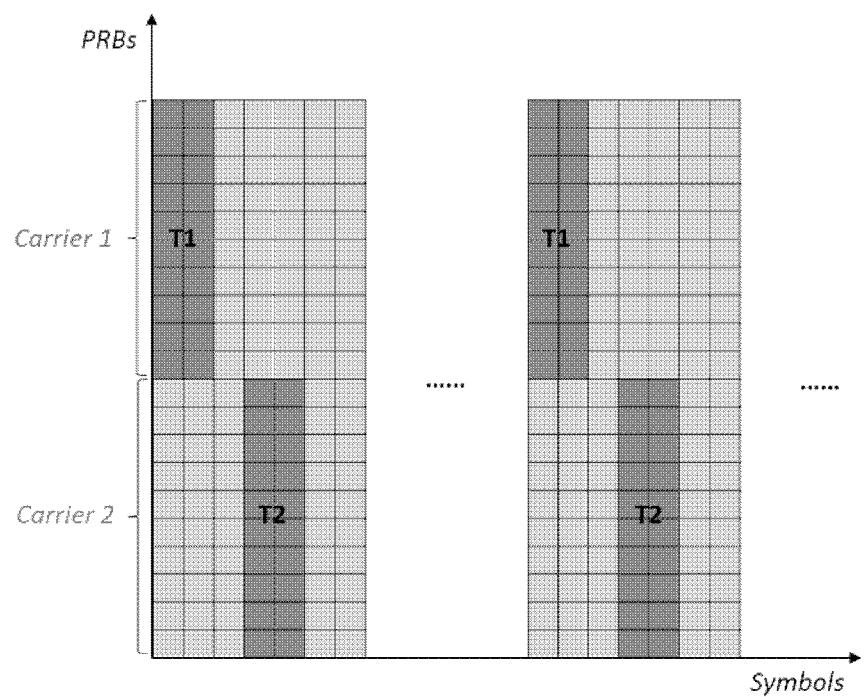
FIG. 7e schematically shows an example of AC time windows defined to calibrate two carriers according to an embodiment of the present disclosure.

FIG. 7e schematically shows an example of AC time windows defined to calibrate two carriers according to an embodiment of the present disclosure. As shown in FIG. 7e, Carrier 1 and Carrie 2 can be scheduled in different time windows. In addition, Carrier 1 and Carrie 2 can be scheduled in the same time window. It is noted that the size, number and location of the AC time-frequency resources blocks as shown in FIG. 7e are only for the purpose of illustration. There may be any other suitable size, number and location of the AC time-frequency resources blocks in other embodiments. For example, in each round AC signals injection, the network function may use the examples of the AC signal as shown in FIGS. 7a-7c.

With reference to FIG. 6, at block 606, the network function may transmit the scheduled AC signals to respective input of at least one radio chain of the network function.

At block 608, the network function may receive the scheduled AC signals from respective output of the at least one radio chain of the network function.

At block 610, the network function may perform the AC based on the received AC signals. For example, when the AC signals is scheduled on a single time-frequency resources block occupying the whole bandwidth for a period of at least one symbol required by the AC signals, then the network function may perform the AC based on the received AC signals using any suitable existing AC methods.

As described above, the AC signals may be scheduled in multiple available time-frequency resources block, and to eliminate the phase and/or amplitude error due to various reasons such as LO drifting and/or other factors between the AC injections, multiple AC signals are overlapped in frequency. After all signal pieces are collected, the phase drift and an amplitude drift may be removed by comparing the overlapped parts.

Figure 7F:
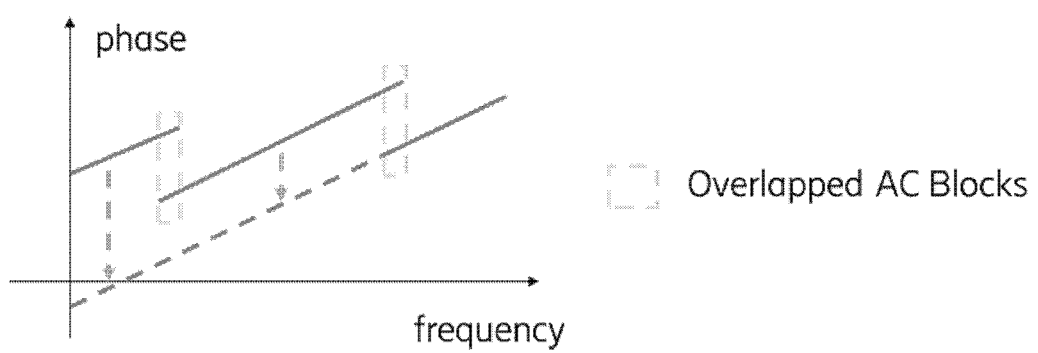
FIG. 7f schematically shows an example of how the frequency overlapped AC blocks are combined together in order to eliminate the phase discontinuity according to an embodiment of the present disclosure.

FIG. 7f schematically shows an example of how the frequency overlapped AC blocks are combined together in order to eliminate the phase discontinuity according to an embodiment of the present disclosure. As shown in FIG. 7f, the phase drift may be removed by comparing the overlapped AC blocks.

Figures 7G, 7H:
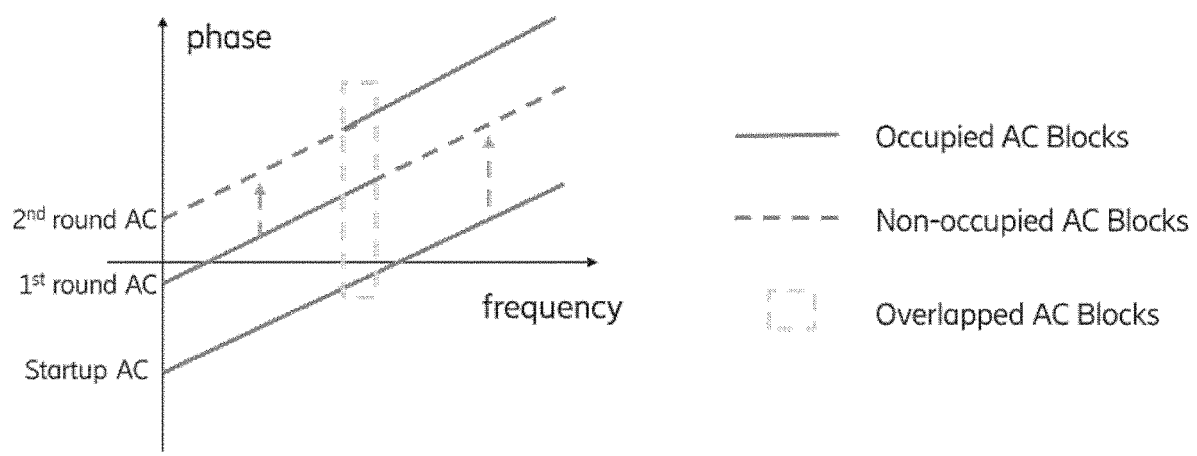
FIG. 7g shows a flowchart of a method according to an embodiment of the present disclosure.
FIG. 7h schematically shows an example of phase estimation of non-occupied AC blocks according to an embodiment of the present disclosure.

FIG. 7g shows a flowchart of a method 620 according to an embodiment of the present disclosure. In this embodiment, the AC signals are required to occupy two or more continuous resource blocks in time and at least one of the AC signals is scheduled at two or more discontinuous resource blocks in time.

At block 622, the network function may remove a phase drift and an amplitude drift between the received AC signals corresponding to the two or more discontinuous resource blocks.

At block 624, the network function may concatenate the received AC signals corresponding to the two or more discontinuous resource blocks together in time.

For example, an example method for removing the phase drift may contain the following steps:
1. Capturing the first AC block into memory;
2. Removing the phase accumulated between the split blocks, and concatenating the split AC blocks together in time;
3. Estimating phase, delay and amplitude over the block frequency range;
4. Repeating steps 1-3 for all AC blocks. Skip step 2 if the AC block is continuous in time;
5. Combining estimates over the whole carrier bandwidth.
6. Eliminating phase, delay and amplitude discontinuity using overlapped AC elements.

As described above, the multiple pieces of AC signals may be also scheduled in multiple AC cycles, and unoccupied bandwidth may be either interpolated/extrapolated from the estimates within occupied spectrum, or from those obtained in the previous AC cycles.

FIG. 7h schematically shows an example of phase estimation of non-occupied AC blocks according to an embodiment of the present disclosure. As shown in FIG. 7h, the unoccupied bandwidth may be either interpolated/extrapolated from the estimates within occupied spectrum, or from those obtained in the previous AC cycles.

For example, the phase of the non-occupied AC blocks may be calculated by the following steps:
1. Measuring the phases of occupied AC block $\theta_{occ\_i}$ of AC cycle i.
$\kappa_{occ\_i} = [\theta_1, \theta_2, \ldots, \theta_k]$, where k is the index of occupied frequency bin.
2. Calculating phase drift $\theta_{delta\_ij}$ between the overlapped AC blocks $\theta_{op\_i}$ and $\theta_{op\_j}$.
An averaging would be done for multiple AC blocks.

$$\theta_{delta\_ij} = \text{average}(\theta_{op\text{-}i} - \theta_{op\text{-}j})$$

3. Calculating the phase of non-occupied AC block $\theta_{nocc\_i}$. Note that the $\theta_{nocc\_i}$ and $\theta_{occ\_j}$ are overlapped in frequency.

$$\theta_{nocc\_i} = \theta_{occ\_j} + \theta_{delta\_ij}$$

Then the phase of whole bandwidth of AC cycle i may be provided as $[\theta_{occ\_i}, \theta_{nocc\_i}]$.

With reference to FIG. 5, at block 504, the network function may communicate with at least one terminal device via the calibrated antenna. For example, the network function may transmit and/or receive data and signaling message to and/or from the at least one terminal device.

Figure 7I:
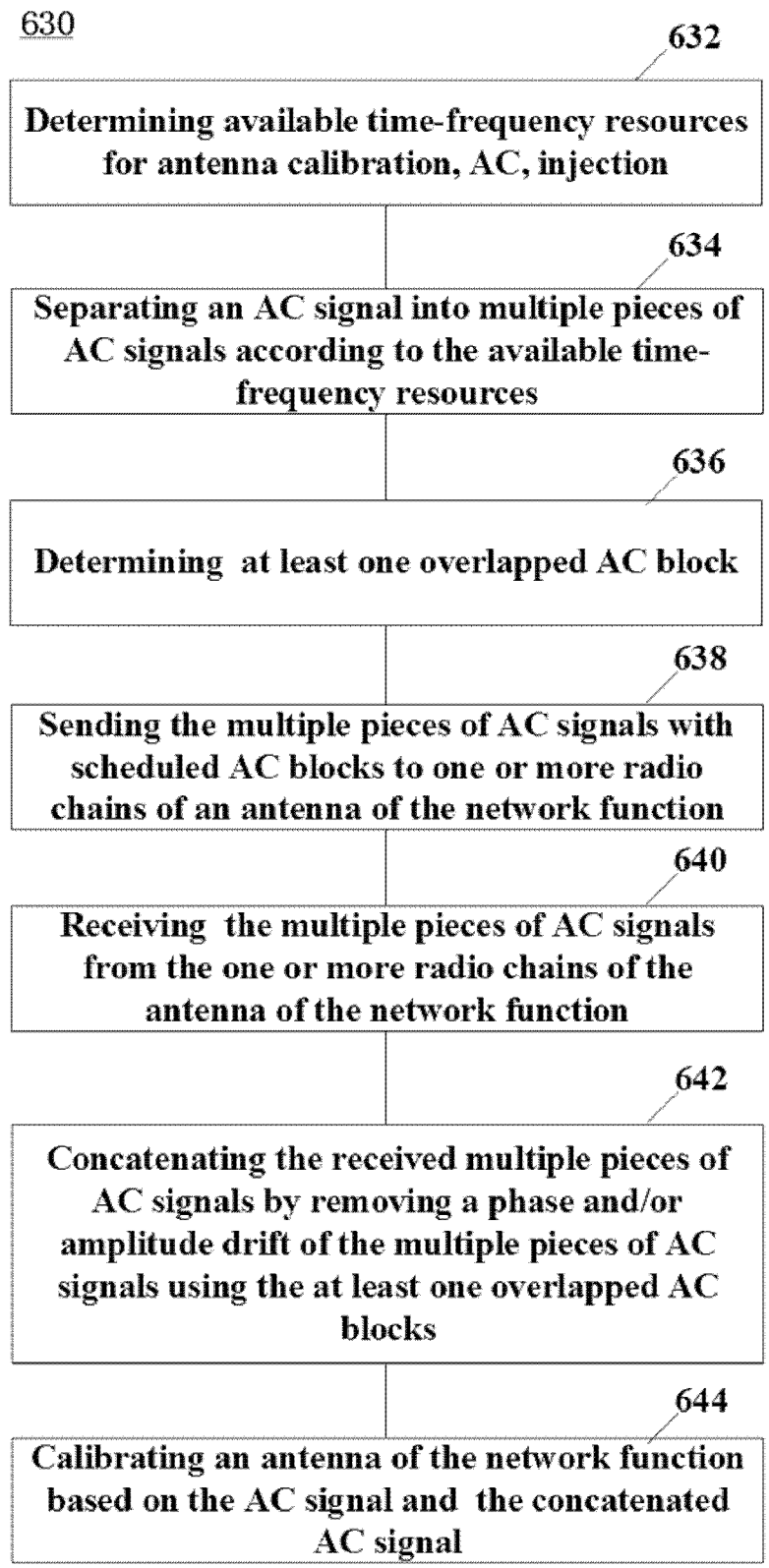
FIG. 7i schematically shows a flow chart of a method for AC according to an embodiment of the present disclosure.

FIG. 7i schematically shows a flow chart of a method (630) for AC according to an embodiment of the present disclosure. For some parts which have been described in the above embodiments, detailed description thereof is omitted here for brevity.

At step 632, the network function may determine available time-frequency resources for AC injection.

At step 634, the network function may separate an AC signal into multiple pieces of AC signals according to the available time-frequency resources. The multiple pieces of AC signals may be scheduled to be sent on respective AC blocks. Block 634 is similar to block 604 of FIG. 6.

At step 636, the network function may determine at least one overlapped AC block.

At step 638, the network function may send the multiple pieces of AC signals with scheduled AC blocks to one or more radio chains of an antenna of the network function.

At step 640, the network function may receive the multiple pieces of AC signals from the one or more radio chains of the antenna of the network function.

At step 642, the network function may concatenate the received multiple pieces of AC signals by removing a phase and/or amplitude drift of the multiple pieces of AC signals using the at least one overlapped AC blocks.

At step 644, the network function may calibrate an antenna of the network function based on the AC signal and the concatenated AC signal.

In an embodiment, the AC signals are multiple orthogonal AC signals for multiple antenna branches.

Figures 7J, 7K:
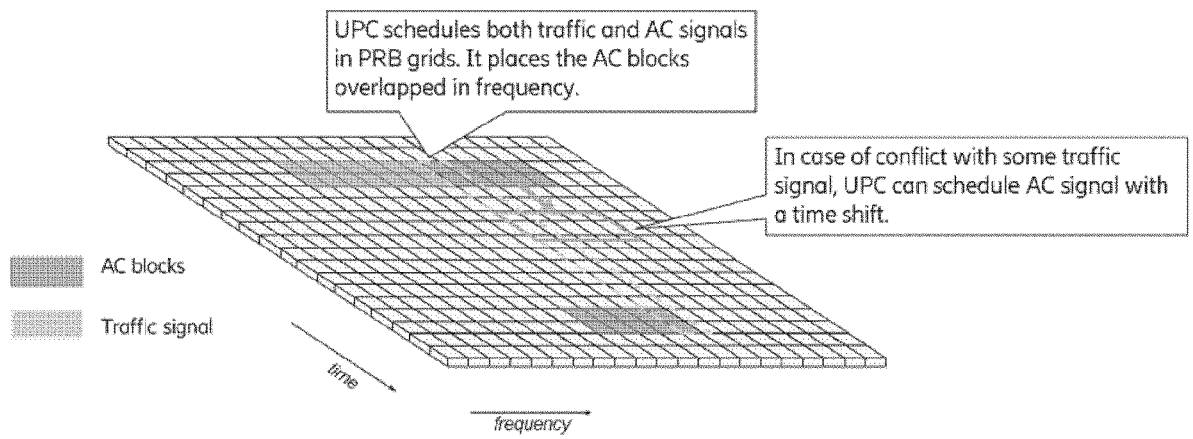
FIG. 7j schematically shows an example of UPC scheduling for traffic and AC signals according to an embodiment of the present disclosure.
FIG. 7k shows a flowchart of a method according to another embodiment of the present disclosure.

FIG. 7j schematically shows an example of UPC (User Plane Control) scheduling for traffic and AC signals according to an embodiment of the present disclosure. As shown in FIG. 7j, UPC in baseband is responsible to schedule both traffic signals and AC signals into PRB grids. In this embodiment, UPC needs to place AC blocks in the way that multiple AC blocks can be overlapped in frequency. In case of conflict, UPC schedules the particular AC block with a time shift but still maintain a frequency overlap for multiple AC blocks. AC interval may be long (e.g. 60 seconds) comparing with UPC scheduling (e.g. per slot), so it's expected that UPC can have sufficient time resource for the time shift to avoid conflicts.

According to various embodiments, the network function may schedule the AC signal with smaller granularity. According to various embodiments, the network function may separate the AC signal into multiple pieces of AC signal. According to various embodiments, the network function may transmit one piece of AC signal according to available resources. According to various embodiments, the network function may transmit pieces of the AC signal overlapped in frequency. According to various embodiments, the network function may remove phase and/or amplitude drifting error by overlapped AC part in frequency. According to various embodiments, the network function may transmit a part of AC signal in one AC cycle according to available resources. According to various embodiments, the network function may interpolate unoccupied spectrum by using occupied spectrum. According to various embodiments, the network function may mitigate the impact of AC signal to traffic data.

FIG. 7k shows a flowchart of a method according to another embodiment of the present disclosure, which may be performed by an apparatus implemented in/as a terminal device or communicatively coupled to the terminal device. As such, the apparatus may provide means or modules for accomplishing various parts of the method 700 as well as means for accomplishing other processes in conjunction with other components. For some parts which have been described in the above embodiments, detailed description thereof is omitted here for brevity.

At block 702, the terminal device may communicate with a network function. For example, the terminal device may transmit and/or receive data and signaling message to and/or from the network function. An antenna of the network function may be calibrated based on available time-frequency resources as described above.

According to various embodiments, the proposed solution may be used for various types of AC such as the AC as shown in FIG. 1 or a mutual coupling AC.

Embodiments herein afford many advantages, of which a non-exhaustive list of examples follows. In some embodiments herein, the proposed solution can lower impact on traffic data during the AC injection. In some embodiments herein, the proposed solution can lower impact on control channels during the injection. In some embodiments herein, the proposed solution can lower the number of time-frequency resources occupied by the AC signal during an AC cycle. In some embodiments herein, the proposed solution can lower processing load, storage usage and interface bandwidth required to support the antenna. The embodiments herein are not limited to the features and advantages mentioned above. A person skilled in the art will recognize additional features and advantages upon reading the following detailed description.

Figure 8A:
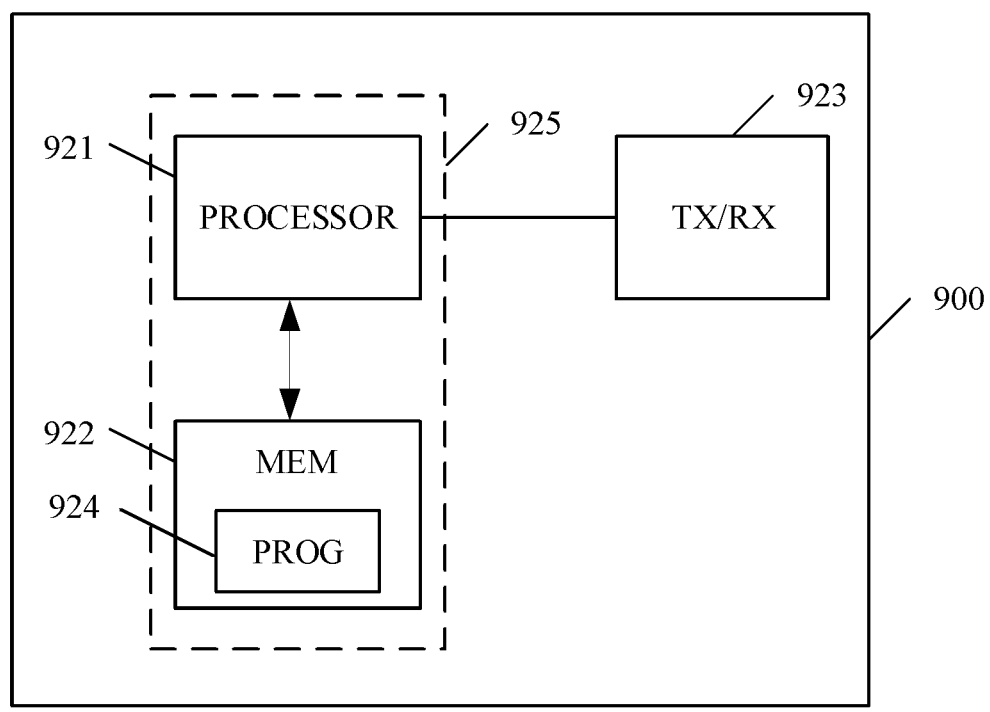
FIG. 8a is a block diagram showing an apparatus suitable for practicing some embodiments of the disclosure.

FIG. 8a is a block diagram showing an apparatus suitable for practicing some embodiments of the disclosure. For example, any one of the network function and the terminal device described above may be implemented as or through the apparatus 800.

The apparatus 800 comprises at least one processor 821, such as a digital processor (DP), and at least one memory (MEM) 822 coupled to the processor 821. The apparatus 820 may further comprise a transmitter TX and receiver RX 823 coupled to the processor 821. The MEM 822 stores a program (PROG) 824. The PROG 824 may include instructions that, when executed on the associated processor 821, enable the apparatus 820 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the network function, the memory 822 contains instructions executable by the processor 821, whereby the network function operates according to any of the methods related to the network function as described above.

In an embodiment where the apparatus is implemented as or at the terminal device, the memory 822 contains instructions executable by the processor 821, whereby the terminal device operates according to the method related to the terminal device as described above.

Figure 8B:
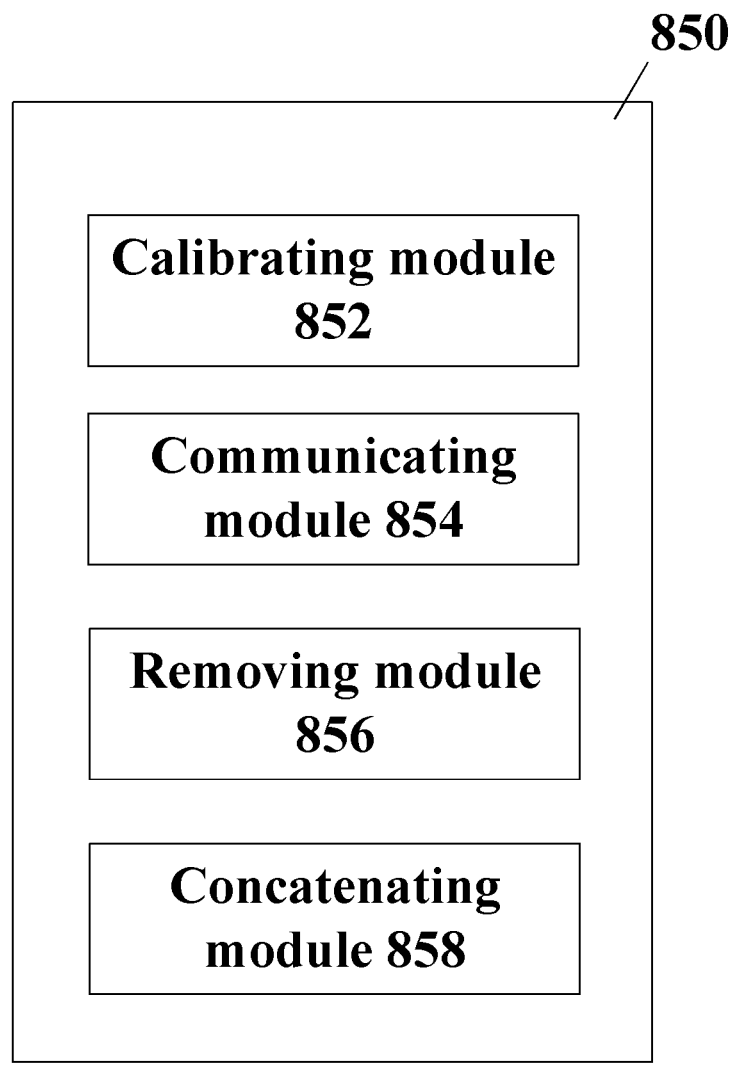
FIG. 8b is a block diagram showing a network function according to an embodiment of the disclosure.

FIG. 8b is a block diagram showing a network function according to an embodiment of the disclosure. As shown, the network function 850 comprises a calibrating module 852 and a communicating module 854. The calibrating module 852 may be configured to calibrate an antenna of the network function based on available time-frequency resources. The communicating module 854 may be configured to communicate with at least one terminal device via the calibrated antenna.

In an embodiment, the network function 850 may further comprise a removing module 856 configured to remove a phase drift and an amplitude drift between the received AC signals corresponding to the two or more discontinuous resource blocks and a concatenating module 858 configured to concatenate the received AC signals corresponding to the two or more discontinuous resource blocks together in time.

Figure 8C:
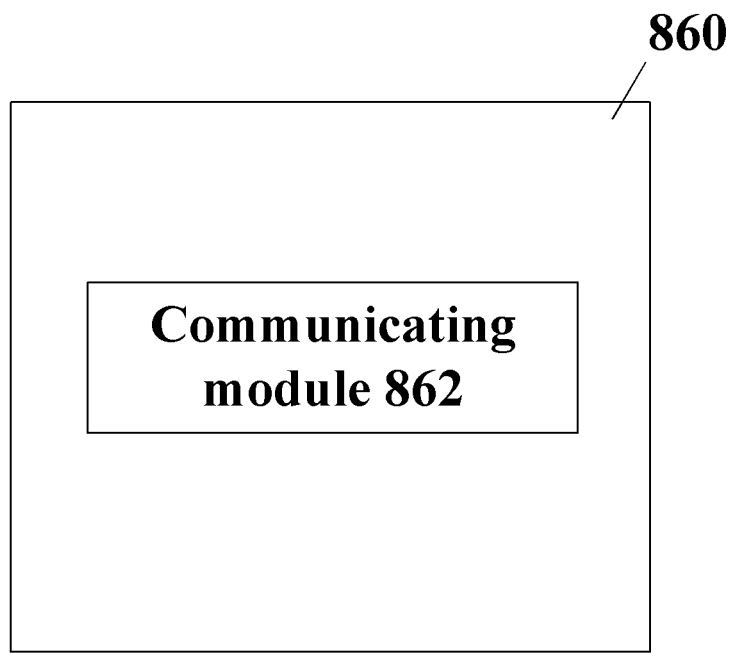
FIG. 8c is a block diagram showing a terminal device according to an embodiment of the disclosure.

FIG. 8c is a block diagram showing a terminal device according to an embodiment of the disclosure. As shown, the terminal device 860 comprises a communicating module 862. The communicating module 862 may be configured to communicate with a network function. An antenna of the network function is calibrated based on available time-frequency resources.

Figure 8D:
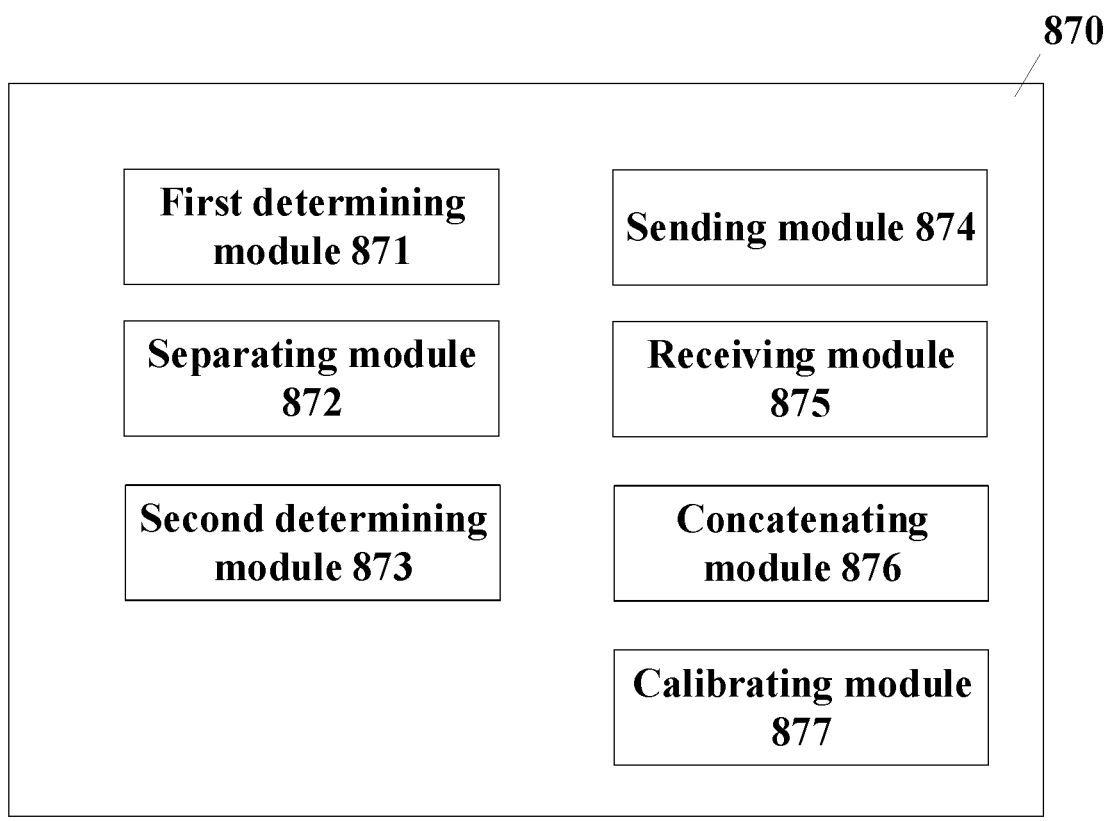
FIG. 8d is a block diagram showing a network function according to an embodiment of the disclosure.

FIG. 8d is a block diagram showing a network function according to an embodiment of the disclosure. As shown, the network function 870 comprises a first determining module 871, a separating module 872, a second determining module 873, a sending module 874, a receiving module 875, a concatenating module 876 and a calibrating module 877. The first determining module 871 may be configured to determine available time-frequency resources for antenna calibration, AC, injection. The separating module 872 may be configured to separate an AC signal into multiple pieces of AC signals according to the available time-frequency resources. The second determining module 873 may be configured to determine at least one overlapped AC block. The sending module 874 may be configured to send the multiple pieces of AC signals with scheduled AC blocks to one or more radio chains of an antenna of the network function. The receiving module 875 may be configured to receive the multiple pieces of AC signals from the one or more radio chains of the antenna of the network function. The concatenating module 876 may be configured to concatenate the received multiple pieces of AC signals by removing a phase and/or amplitude drift of the multiple pieces of AC signals using the at least one overlapped AC blocks. The calibrating module 877 may be configured to calibrate an antenna of the network function based on the AC signals and the concatenated AC signal.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the network function or the terminal device may not need a fixed processor or memory. The introduction of virtualization technology and network computing technology may improve the usage efficiency of the network resources and the flexibility of the network.

Further, the exemplary overall commutation system including the terminal device and the network node such as network function will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 9:
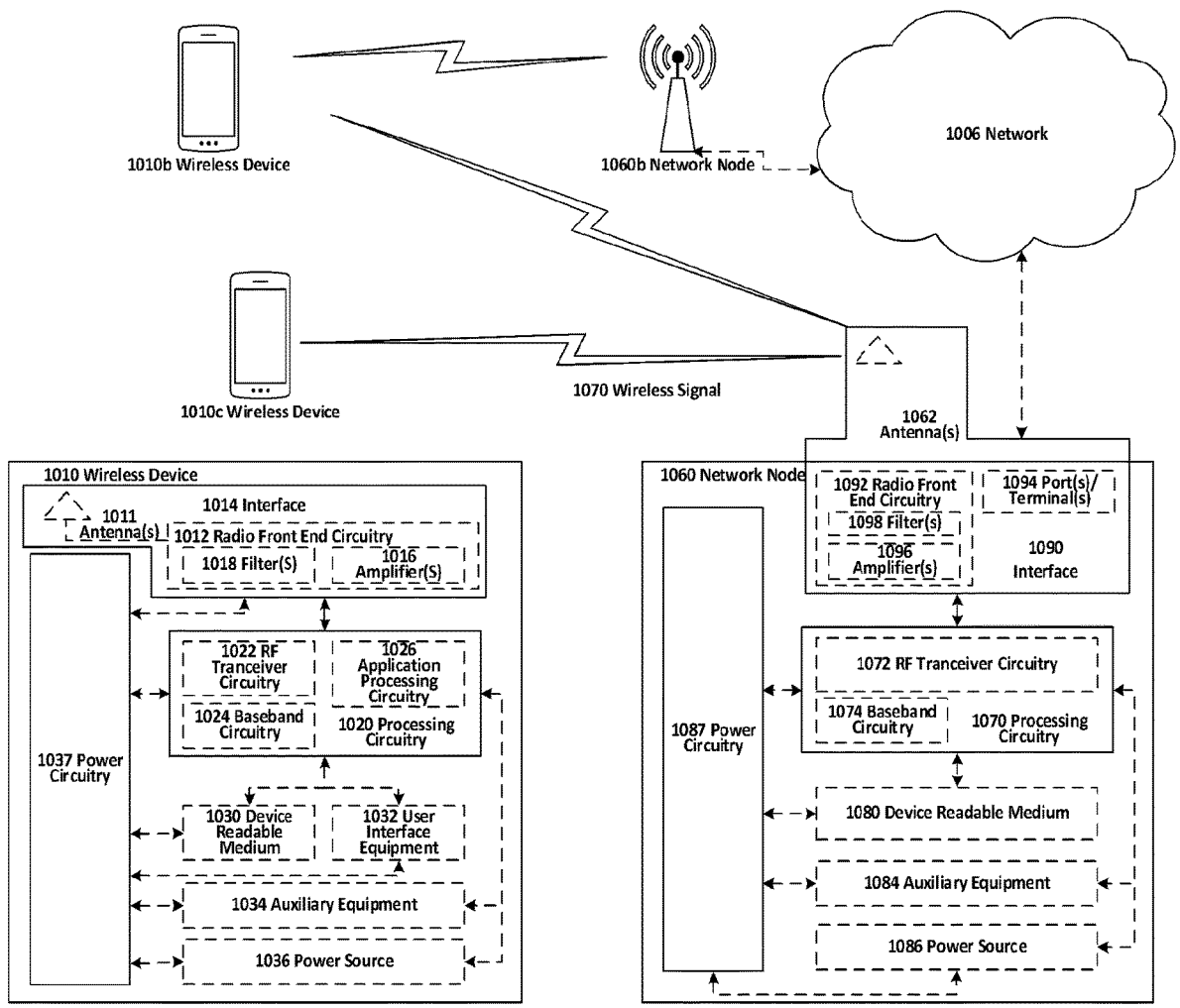
FIG. 9 is a schematic showing a wireless network in accordance with some embodiments.

FIG. 9 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 9 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 10:
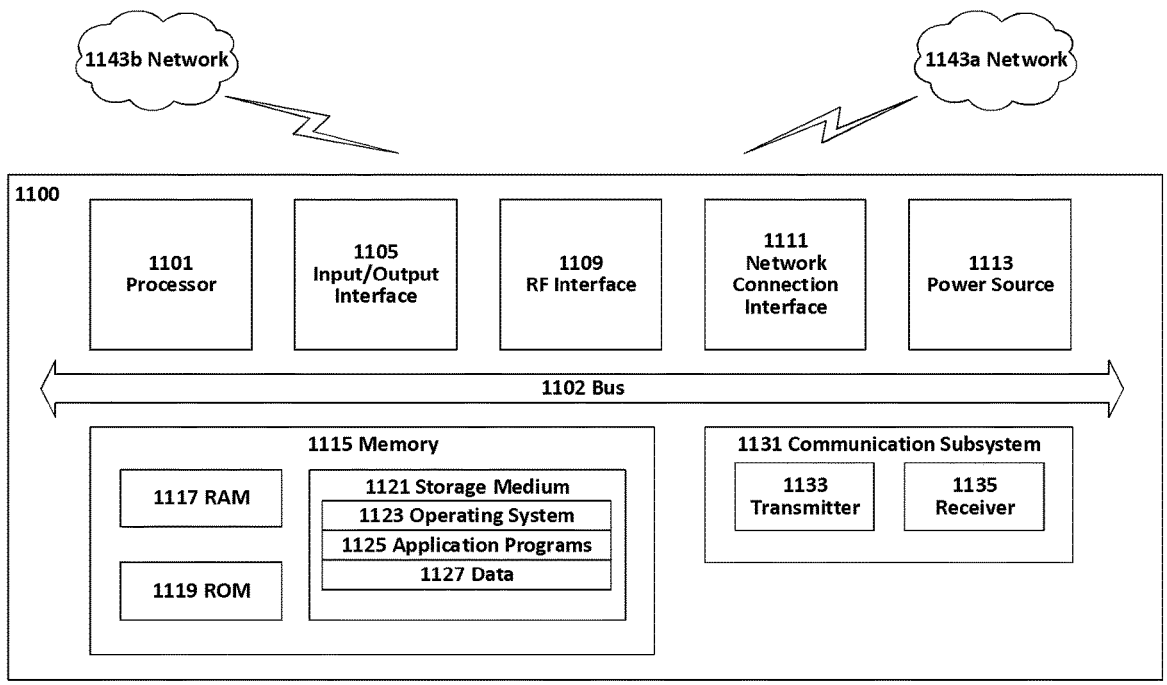
FIG. 10 is a schematic showing a user equipment in accordance with some embodiments.

FIG. 10 is a schematic showing a user equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 10, processing circuitry 1101 may be configured to communicate with network 1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 11:
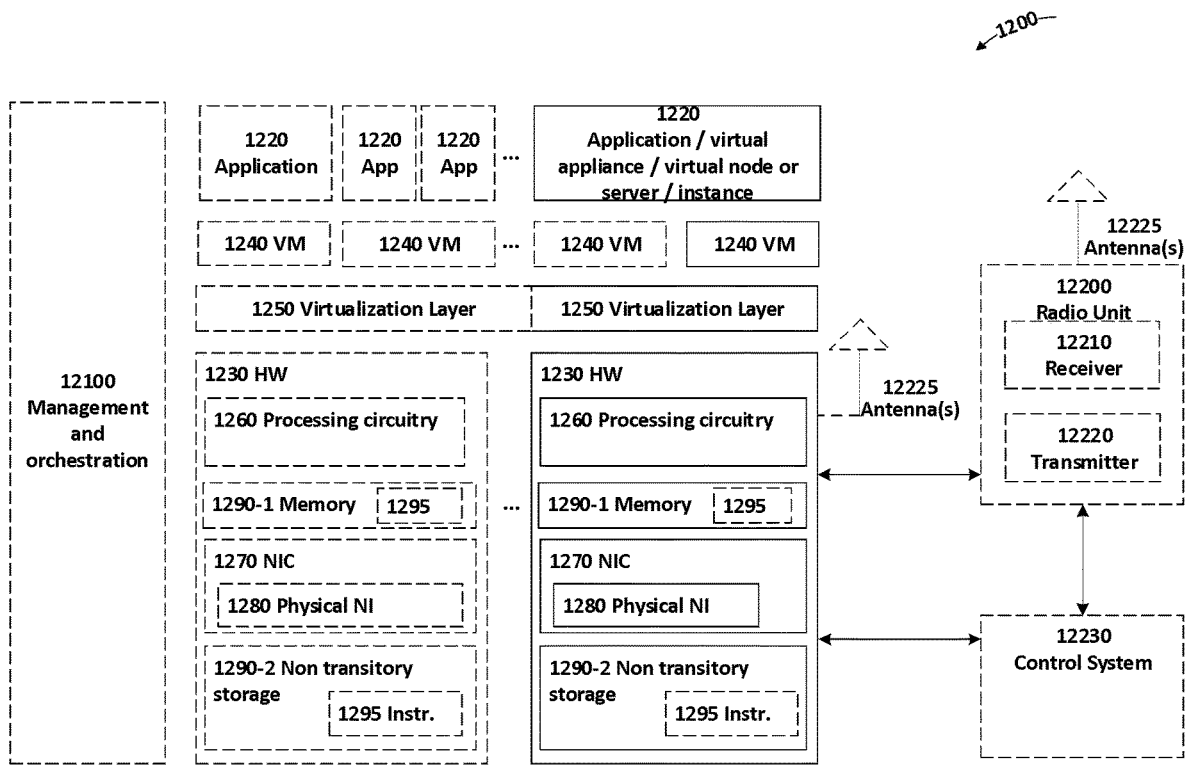
FIG. 11 is a schematic showing a virtualization environment in accordance with some embodiments.

FIG. 11 is a schematic showing a virtualization environment in accordance with some embodiments.

FIG. 11 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 11, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 11.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 12:
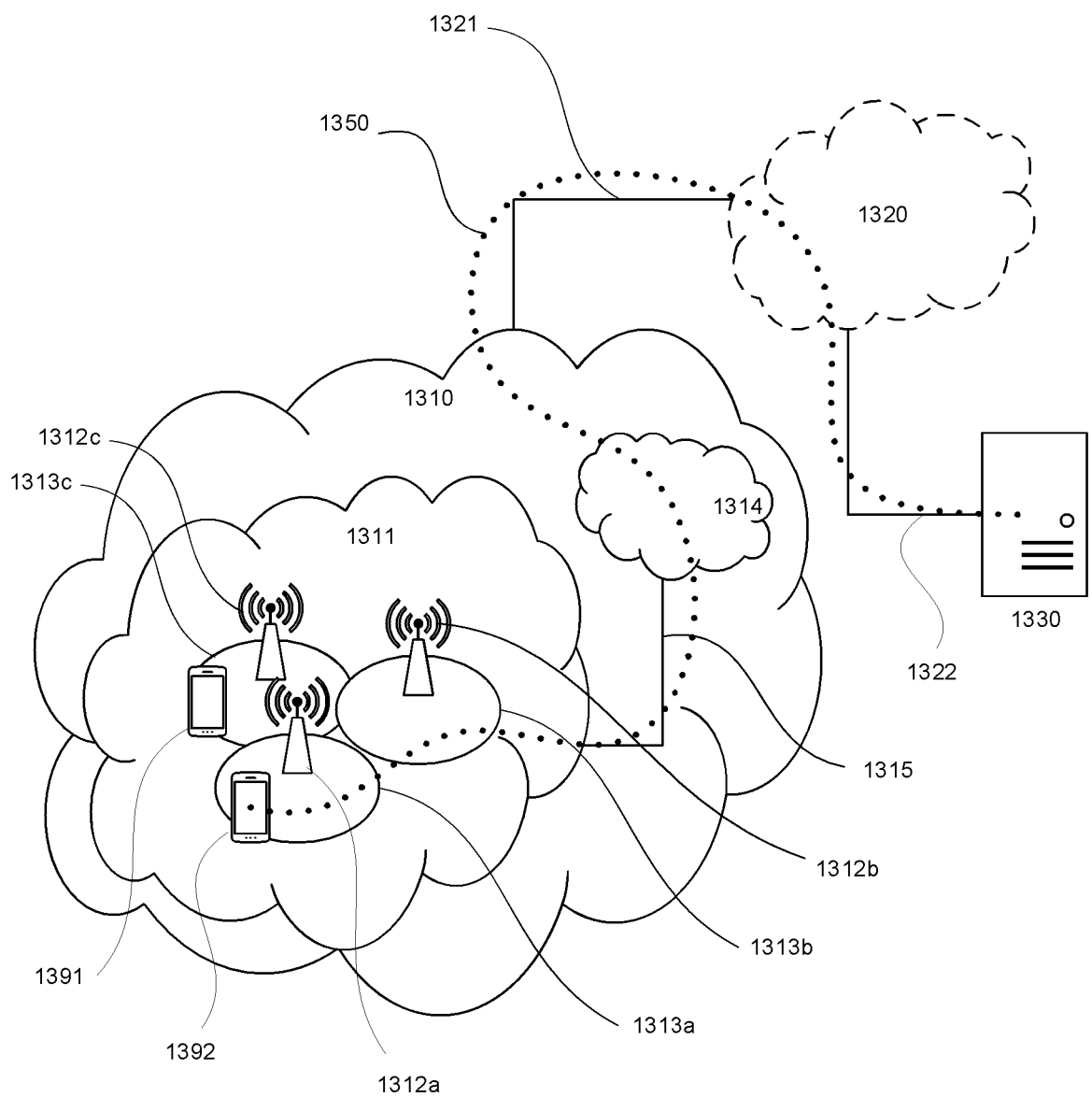
FIG. 12 is a schematic showing a telecommunication network connected via an intermediate network to a host computer in accordance with some embodiments.

FIG. 12 is a schematic showing a telecommunication network connected via an intermediate network to a host computer in accordance with some embodiments.

With reference to FIG. 12, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 12 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 13:
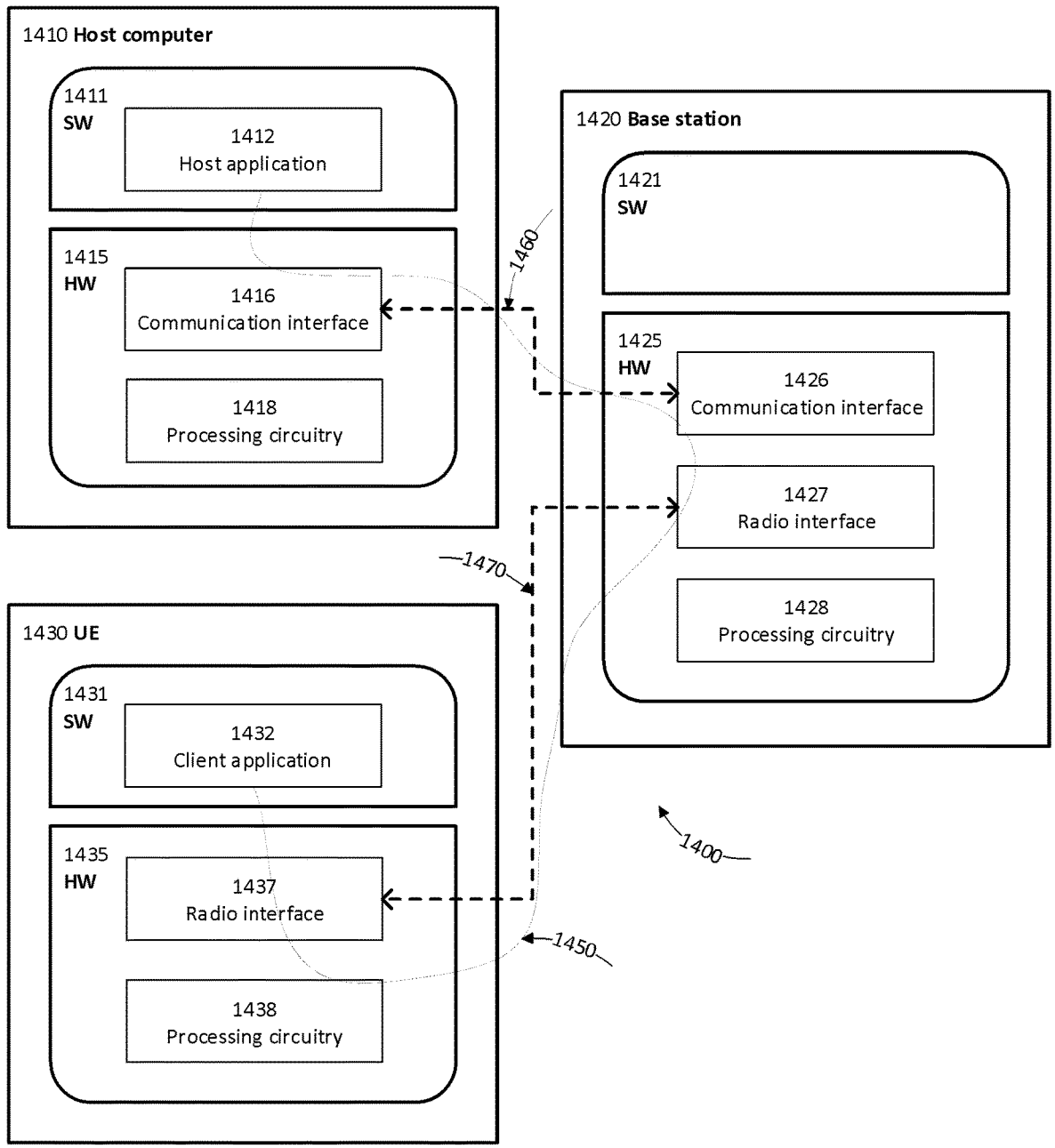
FIG. 13 is a schematic showing a host computer communicating via a base station with a user equipment over a partially wireless connection in accordance with some embodiments.

FIG. 13 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 13) served by base station 1420. Communication interface 1426 may be configured to facilitate connection 1460 to host computer 1410. Connection 1460 may be direct or it may pass through a core network (not shown in FIG. 13) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 13 may be similar or identical to host computer 1330, one of base stations 1312*a*, 1312*b*, 1312*c* and one of UEs 1391, 1392 of FIG. 12, respectively. This is to say, the inner workings of these entities may be as shown in FIG. 13 and independently, the surrounding network topology may be that of FIG. 12.

In FIG. 13, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 14:
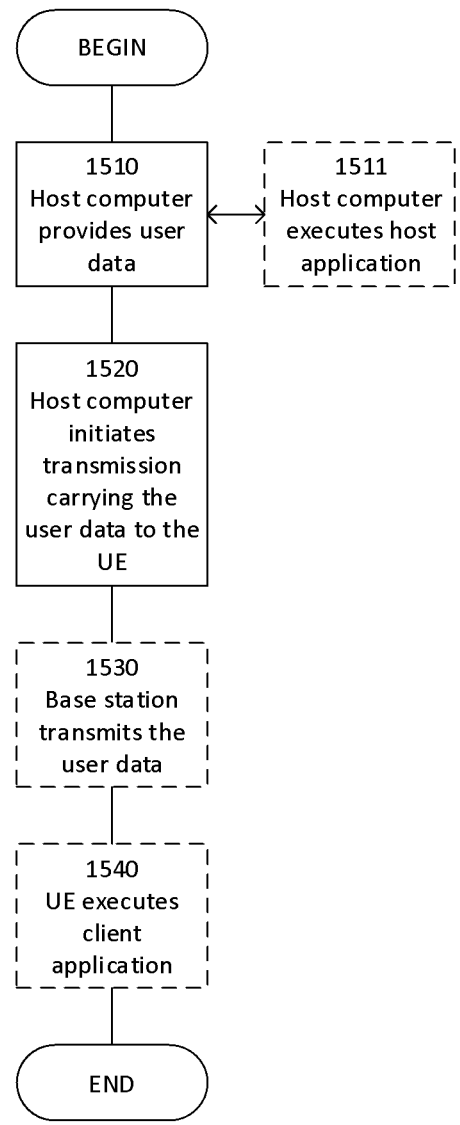
FIG. 14 is a schematic showing methods implemented in a communication system including a host computer, a base station and a user equipment in accordance with some embodiments.

FIG. 14 is a schematic showing methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 15:
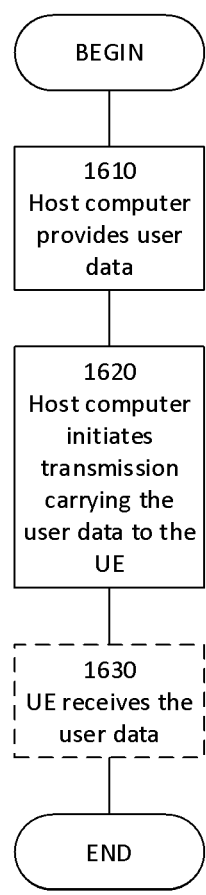
FIG. 15 is a schematic showing methods implemented in a communication system including a host computer, a base station and a user equipment in accordance with some embodiments.

FIG. 15 is a schematic showing methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 16:
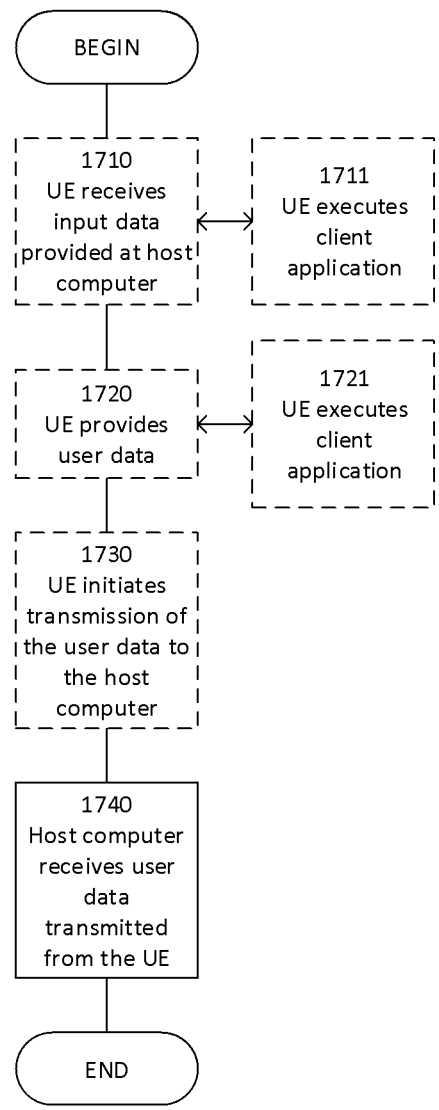
FIG. 16 is a schematic showing methods implemented in a communication system including a host computer, a base station and a user equipment in accordance with some embodiments.

FIG. 16 is a schematic showing methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 17:
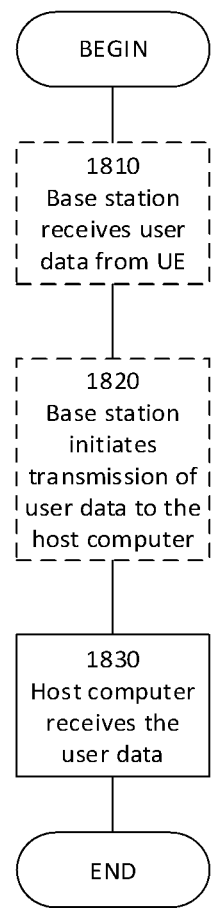
FIG. 17 is a schematic showing methods implemented in a communication system including a host computer, a base station and a user equipment in accordance with some embodiments.

FIG. 17 is a schematic showing methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented at a network function of a communication network, the method comprising:

determining time-frequency resources of the communication network that are available for antenna calibration (AC) injection;
separating an AC signal into multiple AC signal pieces according to the available time-frequency resources;
determining at least one overlapped AC block;
sending the multiple AC signal pieces with scheduled AC blocks to one or more radio chains coupled to an antenna of the network function;
receiving the multiple AC signal pieces from the one or more radio chains coupled to the antenna of the network function;
concatenating the received multiple AC signal pieces into a concatenated AC signal based on removing a phase and/or amplitude drift of the multiple AC signal pieces using the at least one overlapped AC blocks; and
calibrating an antenna of the network function based on the AC signal and the concatenated AC signal.

2. The method according to claim 1, wherein the AC signal comprises multiple orthogonal AC signals for calibration of multiple branches of the antenna.

3. A network function of a communication network, the network function comprising:
a processor; and
a memory storing instructions executable by the processor, whereby the network function is operative to:
determine time-frequency resources of the communication network that are available for antenna calibration (AC) injection;
separate an AC signal into multiple AC signal pieces according to the available time-frequency resources;
determine at least one overlapped AC block;
send the multiple AC signal pieces with scheduled AC blocks to one or more radio chains coupled to an antenna of the network function;
receive the multiple AC signal pieces from the one or more radio chains coupled to the antenna of the network function;
concatenate the received multiple AC signal pieces into a concatenated AC signal based on removing a phase and/or amplitude drift of the multiple AC signal pieces using the at least one overlapped AC blocks; and
calibrate an antenna of the network function based on the AC signal and the concatenated AC signal.

4. The network function of claim 3, wherein the AC signal comprises multiple orthogonal AC signals for calibration of multiple branches of the antenna.

* * * * *